(No Model.)
J. PRICE.
TWO WHEELED VEHICLE.
No. 286,733. Patented Oct. 16, 1883.
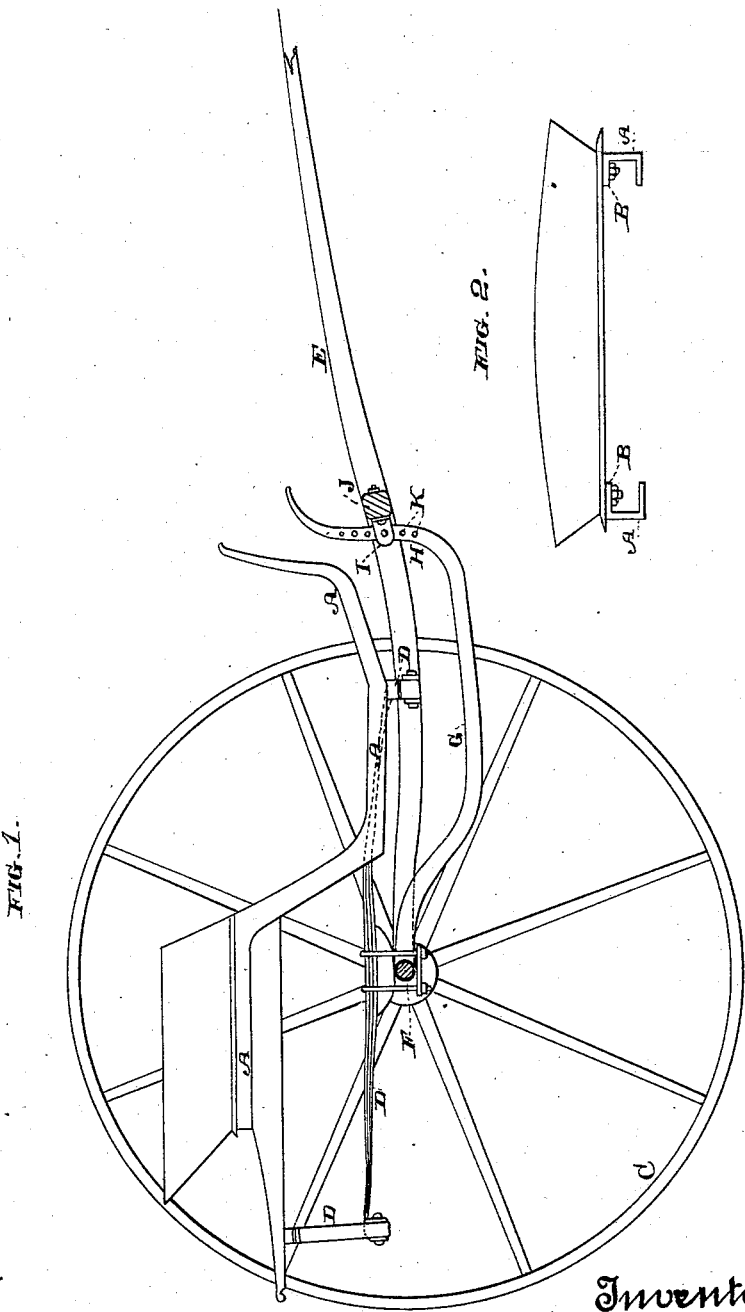
Witnesses,
Geo. H. Strong.
J. H. Towne
Inventor,
Jacob Price
By Dewey & Co.
Attorneys

UNITED STATES PATENT OFFICE.

JACOB PRICE, OF SAN LEANDRO, CALIFORNIA.

TWO-WHEELED VEHICLE.

SPECIFICATION forming part of Letters Patent No. 286,732, dated October 16, 1883.

Application filed May 24, 1883. (No model.)

*To all whom it may concern:*

Be it known that I, JACOB PRICE, of San Leandro, county of Alameda, State of California, have invented an Improved Village-Cart; and I hereby declare the following to be a full, clear, and exact description thereof.

My invention relates to certain improvements in vehicles; and it consists of a novel construction of the body of the vehicle, and of a means for leveling the same to suit the height of animals of different sizes which may be used, as will be more fully explained by reference to the accompanying drawings, in which—

Figure 1 is a side elevation of a two-wheeled cart having the wheel, shaft, and side spring nearest the observer removed. Fig. 2 is a rear view of the body, showing transverse section of the frame.

My invention is more especially designed for pleasure-carriages, village-carts, &c., and consists of iron bars A, which are bent, forged, or cast to form the outline which it is desired to give the bottom of the vehicle. These bars take the place of the side timbers which are usually employed in the construction of vehicles, and are so shaped that they serve as supports for the bottom boards and other parts of the carriage. At the front these irons are bent upward in any desired curve and serve for the attachment of dash-board, while at the rear they are bent up so as to form the seat-support. If the vehicle is a two-seated one, it will be manifest that both seats may be formed by bending the irons at the proper points to form both seats, thus making the entire side frames in a single piece each without joints or weak places, such as must always be made when wood is employed. Although these side bars may be formed of wrought-iron, I also construct them of malleable cast-iron, which enables me to produce more graceful forms, and to cast on, in addition to the two sides, certain ribs and ears for various purposes, such as to support the seat, as shown at B.

The body of my cart is shown in the present case supported upon wheels C by means of a system of springs, D, and the shafts E are connected with the axle F by means of hinge-clips, in the manner usual for four-wheeled vehicles. From the center of the axle an arm, G, extends forward beneath the foot-board or bottom of the vehicle, and is turned up at the front, as shown at H, so as to pass through or between the sides of a guide or ears, I, which is fixed to the front cross-bar, J. The vertical or turned-up portion H is perforated with holes K, corresponding with similar holes through the sides of the ears, so that a pin or bolt may be put through to secure the two together. When a horse of low stature is to be harnessed to the vehicle, the arm G is raised, and the axle is thus rotated, carrying with it the body, which is connected with it by the springs, and it is leveled with reference to the horse. If a tall horse is to be used, the arm G is lowered, rotating the axle in the opposite direction, and the body is still kept level.

This device is applicable to any style of two-wheeled cart.

Having thus described my invention, what I claim as new, and desire to secure by Letters Patent, is—

1. The bar G, secured to the axle and turned up in front, and perforated, in combination with the ears I upon the cross-bar D, substantially as herein described.

2. A two-wheeled vehicle having the shafts hinged to the axle, in combination with a bar secured to the axle, extending forward, and having the front end turned up, with means for holding the same at different elevation, substantially as herein described.

In witness whereof I hereunto set my hand.

JACOB PRICE.

Witnesses:
WM. H. GRAY,
M. M. GILMAN.